United States Patent
Vanman et al.

(10) Patent No.: US 8,487,995 B2
(45) Date of Patent: Jul. 16, 2013

(54) METHOD OF AND SYSTEM FOR MOBILE SURVEILLANCE AND EVENT RECORDING

(75) Inventors: Robert V. Vanman, McKinney, TX (US); Simon C. Goble, Palo Alto, CA (US)

(73) Assignee: Enforcement Video, LLC, Allen, TX (US)

( * ) Notice: Subject to any disclaimer, the term of this patent is extended or adjusted under 35 U.S.C. 154(b) by 682 days.

(21) Appl. No.: 12/780,050

(22) Filed: May 14, 2010

(65) Prior Publication Data

US 2011/0125708 A1    May 26, 2011

Related U.S. Application Data

(63) Continuation of application No. 11/249,662, filed on Oct. 12, 2005, now Pat. No. 8,081,214.

(60) Provisional application No. 60/617,988, filed on Oct. 12, 2004.

(51) Int. Cl.
H04N 7/18 (2006.01)

(52) U.S. Cl.
USPC .......................................................... 348/143

(58) Field of Classification Search
None
See application file for complete search history.

(56) References Cited

U.S. PATENT DOCUMENTS

| | | | |
|---|---|---|---|
| 4,389,706 A * | 6/1983 | Gomola et al. | 700/1 |
| 4,949,186 A | 8/1990 | Peterson | |
| 5,651,075 A | 7/1997 | Frazier et al. | |
| 5,677,979 A | 10/1997 | Squicciarini et al. | |
| 5,703,604 A | 12/1997 | McCutchen | |
| 5,809,161 A | 9/1998 | Auty et al. | |
| 5,844,599 A | 12/1998 | Hildin | |
| 5,898,866 A * | 4/1999 | Atkins et al. | 712/241 |
| 6,215,519 B1 | 4/2001 | Nayar et al. | |
| 6,252,989 B1 | 6/2001 | Geisler et al. | |
| 6,282,462 B1 | 8/2001 | Hopkins | |
| 6,335,789 B1 | 1/2002 | Kikuchi | |
| 6,345,219 B1 | 2/2002 | Klemens | |
| 6,373,962 B1 | 4/2002 | Kanade et al. | |
| 6,389,340 B1 | 5/2002 | Rayner | |
| 6,445,824 B2 | 9/2002 | Hieda | |
| 6,456,321 B1 | 9/2002 | Ito et al. | |
| 6,704,281 B1 | 3/2004 | Hourunranta et al. | |
| 6,707,489 B1 | 3/2004 | Maeng et al. | |

(Continued)

OTHER PUBLICATIONS

Cilia, Andrew, U.S. Appl. No. 13/489,615, filed Jun. 6, 2012.

(Continued)

Primary Examiner — Nhon Diep
(74) Attorney, Agent, or Firm — Winstead PC

(57) ABSTRACT

A data-encoding system includes a source of unencoded data, and a first encoder interoperably coupled to the source, wherein the first encoder is adapted to receive the unencoded data, encode the unencoded data, and output encoded data at a first data rate. The data encoding system further includes a second encoder interoperably coupled to the source, wherein the second encoder is adapted to receive the unencoded data, encode the unencoded data, and output encoded data at a second data rate in which the second data rate exceeds the first data rate. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims.

8 Claims, 7 Drawing Sheets

U.S. PATENT DOCUMENTS

| | | |
|---|---|---|
| 6,734,911 B1 | 5/2004 | Lyons |
| 6,801,574 B2 | 10/2004 | Takeuchi et al. |
| 6,831,556 B1 | 12/2004 | Boykin |
| 7,023,913 B1 | 4/2006 | Monroe |
| 7,119,832 B2 | 10/2006 | Blanco et al. |
| 7,215,876 B2 * | 5/2007 | Okada et al. ............ 386/239 |
| 7,262,790 B2 | 8/2007 | Bakewell |
| 7,272,179 B2 | 9/2007 | Siemens et al. |
| 7,373,395 B2 | 5/2008 | Brailean et al. |
| 7,405,834 B1 | 7/2008 | Marron et al. |
| 7,495,579 B2 | 2/2009 | Sirota et al. |
| 7,574,131 B2 | 8/2009 | Chang et al. |
| 7,583,290 B2 | 9/2009 | Enright et al. |
| 7,711,150 B2 | 5/2010 | Simon |
| 7,768,548 B2 | 8/2010 | Silvernail et al. |
| 7,894,632 B2 | 2/2011 | Park et al. |
| 7,929,010 B2 | 4/2011 | Narasimhan |
| 8,022,874 B2 | 9/2011 | Frieaizen |
| 2002/0040475 A1 * | 4/2002 | Yap et al. ............ 725/39 |
| 2002/0064314 A1 | 5/2002 | Comaniciu et al. |
| 2002/0140924 A1 | 10/2002 | Wangler et al. |
| 2002/0141618 A1 | 10/2002 | Ciolli et al. |
| 2002/0141650 A1 | 10/2002 | Keeney et al. |
| 2002/0149476 A1 | 10/2002 | Ogura |
| 2003/0025599 A1 | 2/2003 | Monroe |
| 2003/0025812 A1 | 2/2003 | Slatter |
| 2003/0071891 A1 | 4/2003 | Geng |
| 2003/0112133 A1 | 6/2003 | Webb et al. |
| 2003/0172123 A1 | 9/2003 | Polan et al. |
| 2003/0214585 A1 | 11/2003 | Bakewell |
| 2004/0056779 A1 | 3/2004 | Rast |
| 2004/0080615 A1 | 4/2004 | Klein et al. |
| 2004/0119869 A1 | 6/2004 | Tretter et al. |
| 2004/0150717 A1 | 8/2004 | Page et al. |
| 2004/0218099 A1 | 11/2004 | Washington |
| 2004/0221311 A1 | 11/2004 | Dow et al. |
| 2004/0223058 A1 | 11/2004 | Richter et al. |
| 2004/0252193 A1 | 12/2004 | Higgins |
| 2004/0258149 A1 | 12/2004 | Robinson et al. |
| 2005/0090961 A1 | 4/2005 | Bonk et al. |
| 2005/0196140 A1 | 9/2005 | Moteki |
| 2005/0206773 A1 | 9/2005 | Kim et al. |
| 2006/0028547 A1 | 2/2006 | Chang |
| 2006/0033813 A1 | 2/2006 | Provinsal et al. |
| 2006/0098843 A1 | 5/2006 | Chew |
| 2006/0152636 A1 | 7/2006 | Matsukawa et al. |
| 2006/0158968 A1 | 7/2006 | Vanman et al. |
| 2006/0159325 A1 | 7/2006 | Zeineh et al. |
| 2006/0187305 A1 | 8/2006 | Trivedi et al. |
| 2006/0193384 A1 | 8/2006 | Boyce |
| 2006/0244826 A1 | 11/2006 | Chew |
| 2007/0024706 A1 | 2/2007 | Brannon et al. |
| 2007/0029825 A1 | 2/2007 | Franklin et al. |
| 2007/0200933 A1 | 8/2007 | Watanabe et al. |
| 2007/0217761 A1 | 9/2007 | Chen et al. |
| 2007/0222678 A1 | 9/2007 | Ishio et al. |
| 2007/0222859 A1 | 9/2007 | Chang et al. |
| 2007/0296817 A1 | 12/2007 | Ebrahimi et al. |
| 2008/0007438 A1 | 1/2008 | Segall et al. |
| 2009/0046157 A1 | 2/2009 | Cilia et al. |
| 2009/0049491 A1 | 2/2009 | Karonen et al. |
| 2009/0102950 A1 | 4/2009 | Ahiska |
| 2009/0129672 A1 | 5/2009 | Camp, Jr. et al. |
| 2009/0207248 A1 | 8/2009 | Cilia et al. |
| 2009/0213218 A1 | 8/2009 | Cilia et al. |
| 2009/0251530 A1 | 10/2009 | Cilia |
| 2011/0157376 A1 | 6/2011 | Lyu et al. |
| 2011/0234749 A1 | 9/2011 | Alon |

OTHER PUBLICATIONS

U.S. Appl. No. 12/362,302, Andrew Cilia et al.
U.S. Appl. No. 13/095,107, Cilia.
U.S. Appl. No. 13/109,557, Cilia.
Copenheaver, Blaine R., International Search Report for PCT/US2009/032462 as mailed Mar. 10, 2009 (3 pages).
Kortum, P. et al., "Implementation of a foveated image coding system for image bandwidth reduction", SPIE Proceedings, vol. 2657, 1996, pp. 350-360, XP-002636638.
Geisler, Wilson S. et al., "A real-time foveated multiresolution system for low-bandwidth video communication", Proceedings of the SPIE—The International Society for Optical Engineering SPIE-INT. Soc. Opt. Eng. USA, vol. 3299, 1998, pp. 294-305, XP-002636639.
U.S. Appl. No. 12/694,931, Cilia.
U.S. Appl. No. 12/779,492, Vanman.
U.S. Appl. No. 12/779,564, Vanman.
U.S. Appl. No. 12/780,092, Vanman.
Copenheaver Blaine R., International Search Report for PCT/US2009/000930 as mailed Apr. 9, 2009, (4 pages).
Young, Lee W., International Search Report for PCT/US2009/000934 as mailed Apr. 29, 2009, (3 pages).
Copenheaver, Blaine R., International Search Report for PCT/US2010030861 as mailed Jun. 21, 2010, (4 pages).
Nhon, Diep T., International Search Report for PCT/US05/36701 as mailed Oct. 25, 2006 (5 pages).

* cited by examiner

METHOD OF AND SYSTEM FOR MOBILE SURVEILLANCE AND EVENT RECORDING

CROSS-REFERENCE TO RELATED APPLICATIONS

This patent application is a continuation of U.S. patent application Ser. No. 11/249,662, filed on Oct. 12, 2005 now U.S. Pat. No. 8,081,214. U.S. patent application Ser. No. 11/249,662 claims priority from U.S. Provisional Patent Application No. 60/617,988, filed on Oct. 12, 2004. U.S. patent application Ser. No. 11/249,662 and U.S. Provisional Patent Application No. 60/617,988 are incorporated herein by reference.

BACKGROUND OF THE INVENTION

This invention is directed to a video surveillance system, and in particular, by way of example and not limitation, to a video surveillance system adapted to be mounted in a law enforcement vehicle for producing a permanent digital evidentiary record, on a multi-media disc, of a traffic stop or other event and incidents occurring after a suspect's vehicle has been stopped.

In law enforcement, a reliable witness that is incapable of perjury is needed to substantiate actions taken by a law enforcement officer and to protect the officer against false allegations by persons involved in an incident. An excellent witness of this type is a video recording of the incident, now widely used in traffic stops and criminal investigations, which can be reviewed after the incident and archived. By recording the incident first-hand as it actually happens, video recordings serve to eliminate conflicting individual interpretations of the incident and facilitate effective and efficient law enforcement.

Vehicle-mounted video cameras to make video records of an incident or scene external to the law enforcement vehicle are well known in the art. For example, U.S. Pat. No. 4,949,186 to Peterson discloses a vehicle-mounted system in which a video-cassette recorder is housed in a vault located in the trunk of a patrol car. U.S. Pat. No. 5,677,979 to Squicciarini et al discloses a video surveillance system which integrates the outputs of a video camera, a radar unit, a remote control, and a wireless microphone to produce a comprehensive video recording of an incident from its beginning to the end. This system also uses a video cassette recorder to capture the incident on videotape. However, VHS and digital video tapes are bulky, requiring considerable space for storage, are susceptible to damage, and degrade over time. Additionally, the data on tapes may only be accessed sequentially.

SUMMARY OF THE INVENTION

A video-data chapter segmentation method includes monitoring for at least one external start trigger, and responsive to detection of at least one of the at least one external start trigger, creating a chapter start point at a point in the video data corresponding to a specified time preceding the at least one detected external start trigger. The method further includes initiating recording of the video data beginning at the point in the video data and monitoring for at least one stop trigger. The method still further includes responsive to detection of at least one of the at least one stop trigger, creating a chapter stop point at a point in the data corresponding to a specified time preceding the at least one detected stop trigger.

A video-data chapter segmentation computer system includes a processor and a memory. The memory includes software instructions adapted to enable the computer system to perform the steps of monitoring for at least one external start trigger, and responsive to detection of at least one of the at least one external start trigger, creating a chapter start point at a point in the video data corresponding to a specified time preceding the at least one detected external start trigger. The software instructions are further adapted to enable the computer system to perform the steps of initiating recording of the video data beginning at the point in the video data, monitoring for at least one stop trigger, and responsive to detection of at least one of the at least one stop trigger, creating a chapter stop point at a point in the data corresponding to a specified time preceding the at least one detected stop trigger.

A data-encoding system includes a source of unencoded data, and a first encoder interoperably coupled to the source, wherein the first encoder is adapted to receive the unencoded data, encode the unencoded data, and output encoded data at a first data rate. The data encoding system further includes a second encoder interoperably coupled to the source, wherein the second encoder is adapted to receive the unencoded data, encode the unencoded data, and output encoded data at a second data rate in which the second data rate exceeds the first data rate.

A data-encoding method includes a first encoder interoperably coupled to a source of unencoded data receiving the unencoded data, encoding the unencoded data, and outputting encoded data at a first data rate. The method further includes a second encoder interoperably coupled to the source receiving the unencoded data, encoding the unencoded data, and outputting encoded data at a second data rate, wherein the second data rate exceeds the first data rate.

A data-overflow-handling method includes storing at least one of captured audio data, video data, and metadata to a first directory of a non-removable data storage medium, and determining whether an event is being recorded. The method further includes responsive to a determination that an event is being recorded, storing an image of the stored at least one of captured audio data, video data, and metadata to a second directory of the non-removable data storage medium. The method still further includes determining whether a predefined capacity threshold relative to a removable data storage medium has been exceeded, and responsive to a determination that the predefined capacity threshold has been exceeded, creating a third directory of the non-removable data storage medium. The method still further includes determining whether data in the second directory of the non-removable storage medium has not been stored to the removable data storage medium, and responsive to a determination that data in the second directory of the non-removable storage medium has not been stored to the removable data storage medium, storing any unstored data in the second directory to the removable data storage medium. The method further includes determining whether the second directory contains finalization files, and responsive to a determination that the second directory contains finalization files, finalizing the removable storage medium and providing a prompt to insert another removable storage medium. The method still further includes responsive to a determination that the second directory contains no finalization files, returning to the step of determining whether data in the second directory of the non-removable storage medium has not been stored to the removable data storage medium.

A data-overflow-handling computer system includes a processor and a memory. The memory includes software instructions adapted to enable the computer system to perform the steps of storing at least one of captured audio data, video data, and metadata to a first directory of a non-removable data storage medium, determining whether an event is being recorded, and responsive to a determination that an event is being recorded, storing an image of the stored at least one of captured audio data, video data, and metadata to a second directory of the non-removable data storage medium. The memory further includes software instructions adapted to enable the computer system to perform the steps of determining whether a predefined capacity threshold relative to a removable data storage medium has been exceeded, and responsive to a determination that the predefined capacity threshold has been exceeded, creating a third directory of the non-removable data storage medium. The memory further includes software instructions adapted to enable the computer system to perform the steps of determining whether data in the second directory of the non-removable storage medium has not been stored to the removable data storage medium, and responsive to a determination that data in the second directory of the non-removable storage medium has not been stored to the removable data storage medium, storing any unstored data in the second directory to the removable data storage medium. The memory further includes software instructions adapted to enable the computer system to perform the steps of determining whether the second directory contains finalization files, and responsive to a determination that the second directory contains finalization files, finalizing the removable storage medium and providing a prompt to insert another removable storage medium. The memory still further includes software instructions adapted to enable the computer system to perform the step of responsive to a determination that the second directory contains no finalization files, returning to the step of determining whether data in the second directory of the non-removable storage medium has not been stored to the removable data storage medium.

A method for archiving data includes receiving data, storing the data on a first data storage medium, and selecting a portion of the data. The method further includes determining if at least one environmental factor indicates that environmental conditions are acceptable for storing the selected portion of the data on a second data storage medium. The method still further includes responsive to a determination that the at least one environmental factor indicates that environmental conditions are acceptable, storing the selected portion of the data on the second data storage medium.

A computer system for archiving data includes a processor and a memory. The memory includes software instructions adapted to enable the computer system to perform the steps of receiving data, storing the data on a first data storage medium, and selecting a portion of the data. The memory further software instructions adapted to enable the computer system to perform the steps of determining if at least one environmental factor indicates that environmental conditions are acceptable for storing the selected portion of the data on a second data storage medium, and responsive to a determination that the at least one environmental factor indicates that environmental conditions are acceptable, storing the selected portion of the data on the second data storage medium.

A data security method includes performing a checksum on data contained on a removable data storage medium, and storing the checksum on the removable data storage medium in at least one of an encrypted and a hidden form. The method further includes storing a unique serial number pertaining to the removable storage medium to the removable storage medium, and storing a checksum and a corresponding unique serial number of a plurality of previous removable storage media to the removable storage medium.

A data security computer system includes a processor and a memory. The memory includes software instructions adapted to enable the computer system to perform the steps of performing a checksum on data contained on a removable data storage medium, and storing the checksum on the removable data storage medium in at least one of an encrypted and a hidden form. The memory further includes software instructions adapted to enable the computer system to perform the steps of storing a unique serial number pertaining to the removable storage medium to the removable storage medium, and storing a checksum and a corresponding unique serial number of a plurality of previous removable storage media to the removable storage medium.

The above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

Figure 1:
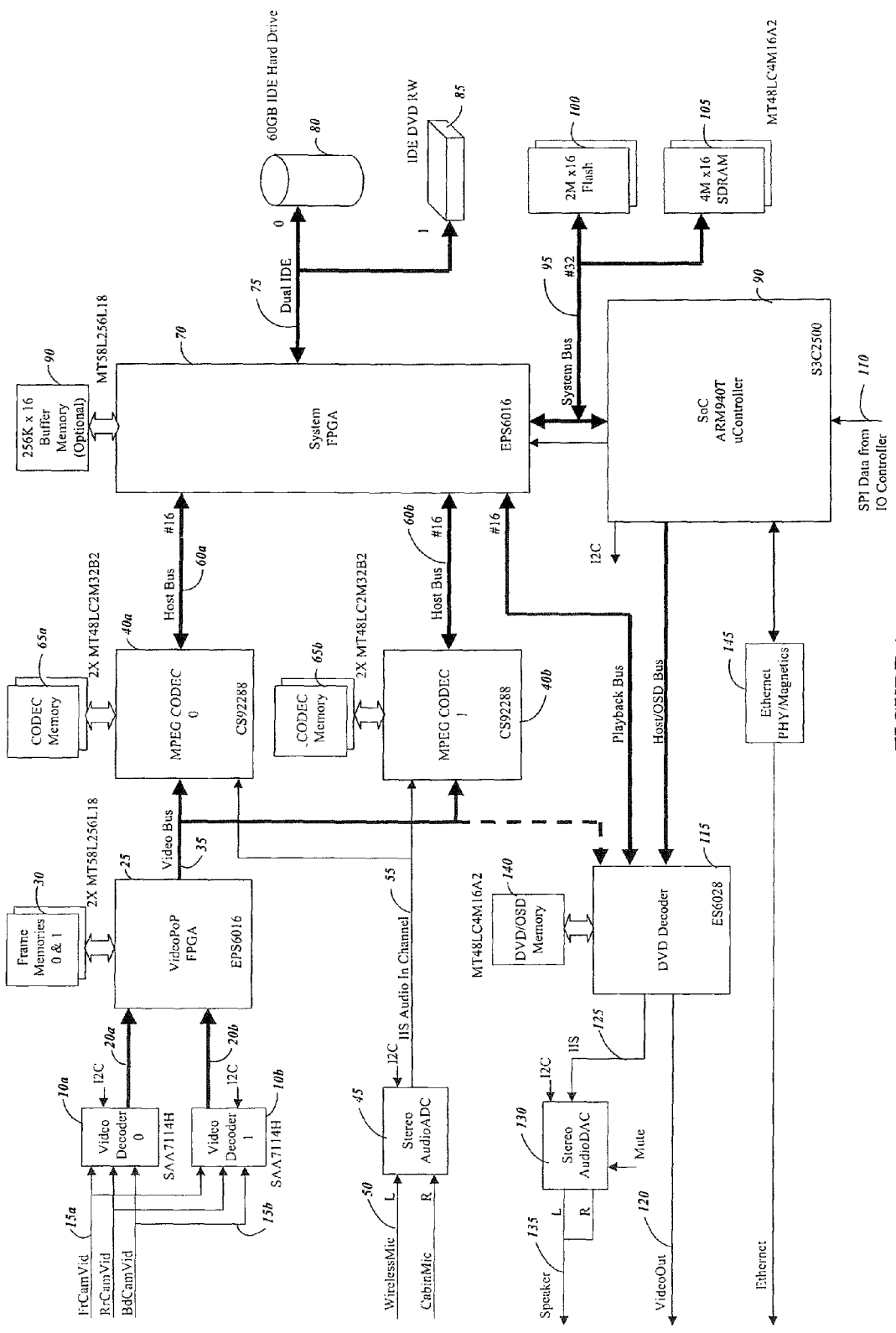
FIG. 1 is a block diagram of an in-vehicle system for recording video, audio, and data in accordance with principles of the present invention.

Referring now to FIG. 1, a block diagram of an in-vehicle system for recording video, audio, and data in accordance with an embodiment of the present invention is illustrated. In the system of FIG. 1, a first video decoder 10a and a second video decoder 10b each include a plurality of respective video inputs 15a, 15b for receiving analog video signals from one or more video sources, such as, for example, a video camera. In the embodiment of the present invention illustrated in FIG. 1, each of the video decoder 10a and 10b receives analog video signals from a front video camera, a rear video camera, and an in-vehicle camera, although it should be understood that, in some embodiments, more or fewer cameras may be used. Each of the video decoders 10a, 10b processes the received video signals and produces respective digital video signals 20a and 20b. The digital video signals 20a and 20b are then provided to a video processor 25. The video processor 25 processes the digital video signals 20a and 20b and outputs the processed video signals to a video bus 35 as a video stream.

In an exemplary embodiment of the present invention, the video processor 25 includes a video picture-over-picture (POP) field programmable gate array (FPGA) chip that processes video from one or more sources to combine the video from the multiple sources to be combined into a single video stream. For example, two video camera feeds can be processed by the video processor 25 for simultaneous display on the same screen as a split screen image. The system of FIG. 1 can be further provided with a frame memory 30 associated with the video processor 25 to store video frames during processing by the video processor 25. The video stream from the video bus 35 is provided to first and second audio/video encoder integrated circuits (ICs) 40a, 40b. In accordance with principles of the present invention, the first and second video encoder ICs 40a, 40b include circuitry adapted to encode video and audio in compliance with a Motion Picture Expert Group (MPEG) standard, such as the MPEG-2 standard. For example the first and second video encoders 40a, 40b can be MPEG codec ICs. However, other video-encoding standards may be used without departing from principles of the invention.

The system of FIG. 1 also includes an audio analog-to-digital converter 45 adapted to receive analog audio signals 50 from one or more audio sources, such as microphones, and process the analog audio signals 50 to produce a digital audio signal 55. In accordance with the embodiment of the present invention illustrated in FIG. 1, an analog audio signal from a wireless microphone is provided to a left channel input of the audio analog-to-digital converter 45, an analog audio signal from a cabin microphone is provided to a right channel of the audio analog-to-digital converter 45, and the audio analog-to-digital converter 45 outputs a combined digital audio signal 55 therefrom.

The digital audio signal 55 is then provided to each of the first and second audio/video encoder ICs 40a, 40b. Each of the first and second audio/video encoder ICs 40a, 40b encodes the video stream received from the video bus 35 and the digital audio signal 55 from the audio analog-to-digital converter 45 as respective encoded audio/video streams 60a and 60b, such as, for example, MPEG-2 streams. In various embodiments of the present invention, the first audio/video encoder IC 40a and the second audio/video encoder IC 40b output representations of the same video and audio streams that have been encoded at different data rates in parallel. For example, in accordance with principles of the present invention, the first audio/video encoder IC 40a outputs a high-bit-rate encoded stream 60a (e.g., 6.0 Mbps), while the second audio/video encoder IC 40b outputs a low-bit-rate encoded stream 60b (e.g., 1.0 Mbps) representation of the same audio and video signals. The low-bit-rate stream can be obtained, for example, by reducing at least one of the video resolution and the frame rate. The system of FIG. 1 can be further provided with first and second coded memory 65a, 65b associated with each of the first and second audio/video encoder ICs 40a, 40b, respectively, for use by the first and second audio/video encoder ICs 40a, 40b as memory storage during encoding operations.

The resolution, bit-rate, and frame rate of both the low-bit-rate stream and the high-bit-rate stream can be set based on a record length selection made in a setup menu. Some example combinations are shown in Table 1:

TABLE 1

| Resolution | Var. Bit rate | Frame Rate | Record Length |
|---|---|---|---|
| 720 × 480 | 5-6 Mbps | 30 fps | 2 hrs |
| 480 × 480 | 2.0 Mbps | 30 fps | 4 hrs |
| 352 × 480 | 1.5 Mbps | 30 fps | 6 hrs |
| 352 × 480 | 1.1 Mbps | 30 fps | 8 hrs |

Each of the first encoded stream 60a and the second encoded stream 60b are then provided to a system FPGA 70.

The system FPGA 70 provides the first encoded stream 60a and the second encoded stream 60b over an IDE bus 75 to a hard drive 80. The system of FIG. 1 can further include a buffer memory 90 associated with the system FPGA 70 to buffer data before it is written to the hard drive 80. The first encoded stream 60a and the second encoded stream 60b are each buffered and written to the hard drive 80. As a result, two versions of the same video and audio source, for example, a high-bit-rate encoded and a low-bit-rate encoded version, are buffered and written to the hard drive 80 for subsequent processing. After a predetermined time period has elapsed and/or after a particular event has occurred, the encoded video and audio data may be sent over the IDE bus 75 from the hard drive 80 to a DVD read/write (RW) drive 85 for archiving to a DVD disc. In accordance with an embodiment of the present invention, the encoded video and audio data is written to the DVD disc so that the DVD disc is formatted as a standard DVD video disc playable in a standalone (i.e., non-PC based) DVD player. The hard drive 80 is described as an example of a non-removable data storage medium such as typically found in personal computers. A DVD disc is described as an example of a removable data storage medium. Other examples of removable data storage media include floppy discs, and flash memory drives.

The system of FIG. 1 further includes a microcontroller 90 that functions to control the various components as well as the overall operation of the system of FIG. 1. Flash memory 100 and dynamic RAM 105 may further be connected to the microcontroller 90 via a system bus 95. The flash memory 100 may function to store firmware for use by the microcontroller 90, and the dynamic RAM 105 may be used by the microcontroller 90 as temporary storage. In accordance with principles of the present invention, the firmware within the flash memory 100 can be upgraded, for example, by inserting a disc including updated firmware into the DVD RW drive 85.

The microcontroller 90 is further provided with a data input 110 for receiving metadata including externally-measured data. Examples of metadata that can be provided to the data input 110 include Global Positioning System (GPS) coordinates, GPS calculated patrol speed, vehicle speed sensor (VSS) calculated patrol speed, radar measured patrol speed, radar target speed, accelerometer X, Y, and Z values, braking status, emergency lights status, siren status, system board temperature, drive door opening and closing logging, power up and power down logging, and DVD disc ejection and insertion logging. The metadata is provided by the microcontroller 90 to the system FPGA 70, which further transmits the metadata to the hard drive 80, where it is written to a metadata log file in association with the encoded audio and video data. Accordingly, a particular item of metadata can be directly linked to the audio and video segment obtained at the time that the metadata item was measured.

In addition, a subset of the metadata is included in the encoded audio and video data so that it is available for viewing in parallel with the audio and video during playback. In accordance with an embodiment of the present invention, the subset of the metadata is included in one or more closed-captioning fields of an MPEG-2 encoded DVD disc. An advantage provided by including the subset of the metadata in a closed-captioning field is that the visibility of the metadata information can be selectively toggled by a viewer of the audio and video. Another advantage provided by including the subset of the metadata in a closed-captioning field is that the information in the closed-captioning field is a text overlay that does not effect the encoding of the underlying video; thus, the underlying video is not degraded by the inclusion of the metadata. Examples of metadata that may be included in the closed-captioning field include time, date, frame counter, vehicle ID, GPS longitude and latitude, vehicle speed (from VSS signal), radar target speed, radar patrol car speed, remote microphone active indicator, emergency lights active indicator, siren active indicator, braking in progress indicator, and camera ID and zoom level. In still another embodiment of the present invention, the subset of metadata may by provided in a subtitle field.

The system of FIG. 1 further allows for playback of encoded audio and video stored on the hard drive 80 and a disc in the DVD RW drive 85. To accomplish playback, the system of FIG. 1 further includes a DVD decoder 115 that receives encoded audio and video from either the hard drive 80 or the DVD RW drive 85 via a playback bus. The DVD decoder 115 decodes the video into a video output signal 120 and decodes the audio into a digital audio signal 125. The digital audio signal 125 is provided to a digital-to-audio converter 130 that converts the digital audio signal to an analog audio signal 135. A DVD/on-screen display (OSD) memory 140 may further be provided for use by the DVD decoder 115 as temporary storage during decoding.

The system of FIG. 1 may also be provided with an Ethernet interface 145 that allows for communication between either a wired or wireless Ethernet-connected device and the microcontroller 90. The Ethernet interface 145 may be used, for example, for transmitting encoded audio and video, as well as associated metadata, to a central office. The Ethernet port can also be used for uploading new firmware files, and for populating user settings as configured on a laptop computer attached to the invention. Specific identifiers shown in FIG. 1 for various components illustrated therein are for illustrative purposes. These identifiers will be understood by those having skill in the art to be merely examples of components that could be employed in the system shown therein. Other commercially available components could be employed without departing from the principles of the invention.

Event Based Recording

In various embodiments of the present invention, recording of video, audio, and metadata is event-based. In these embodiments, the system only records when a triggering event has occurred, for example, when the user turns on the emergency lights, siren, the onboard accelerometers sense a vehicle crash, or when the user manually hits a record button. Upon occurrence of the event, the beginning of a recorded event is marked. Other examples of an event that initiates recording can be, for example, a traffic stop, a chase, a domestic call, or pulling into a driveway. The recording of the event continues until a stop point is determined. In at least one embodiment of the present invention, the stop point is determined when the user hits a stop button. The system may also include an automatic stop event that allows the system to automatically stop recording at a predetermined time after all start record triggers have been turned off (e.g., the lights and siren are off and the wireless microphone is off), but the user has forgotten to hit the stop button. If the system detects that that condition has occurred based on user settings, it can decide to enter a stop flag and stop recording the event.

In at least one embodiment of the present invention, when the system is turned on, two data streams (i.e., a high bit-rate stream and a low bit-rate stream) as well as metadata are recorded to the hard drive 80. The metadata may include, for example, the status of the brake lights, status of the emergency lights and siren, GPS coordinates, the vehicle's speed, data from an interface from the police radar system, etc. The metadata and the high and low bit-rate streams are time-stamped and synchronized. During recording to a DVD disc, the video and/or audio of events, as well as the metadata are recorded to the DVD disc.

The system may also use vehicle speed as a recording trigger where the system can initiate the recording of an event if the patrol car exceeds a preset speed. For example, a department supervisor can decide that if an officer ever goes in excess of 110 miles an hour, the system should begin recording an event to the hard drive 80 or the DVD drive 85. A new event begins automatically and the officer has no control over the recording of the event. Likewise, organizations outside of law enforcement may utilize threshold criteria for initiating self-activating monitoring of persons or conditions.

Opportunistic Archiving

The automobile environment is subject to demanding environmental conditions for the operation of electronic equipment. Recording onto a rewriteable DVD in an automobile environment is particularly subject to these conditions. A system in accordance with principles the present invention has a drive suspension system in place. The system monitors shock and vibration in x, y, and z axes using accelerometers. The system may also monitor the vehicle speed by one or more of three methods. The system can monitor vehicle speed through the VSS signal. If an optional GPS subsystem is included in the system, the system can get speed coordinates from the GPS data. If the system is interfaced to a radar system and the radar is operating in moving mode, the system can get vehicle speed from the radar. In various embodiments of the present invention, an opportunistic archiving algorithm is used that provides parameters and steering as to when the system should burn to the DVD drive 85. Using shock and vibration measurements, the opportunistic archiving algorithm is adapted to ensure that data is not written to the DVD disc until environmental conditions are acceptable for doing so.

Figure 2:
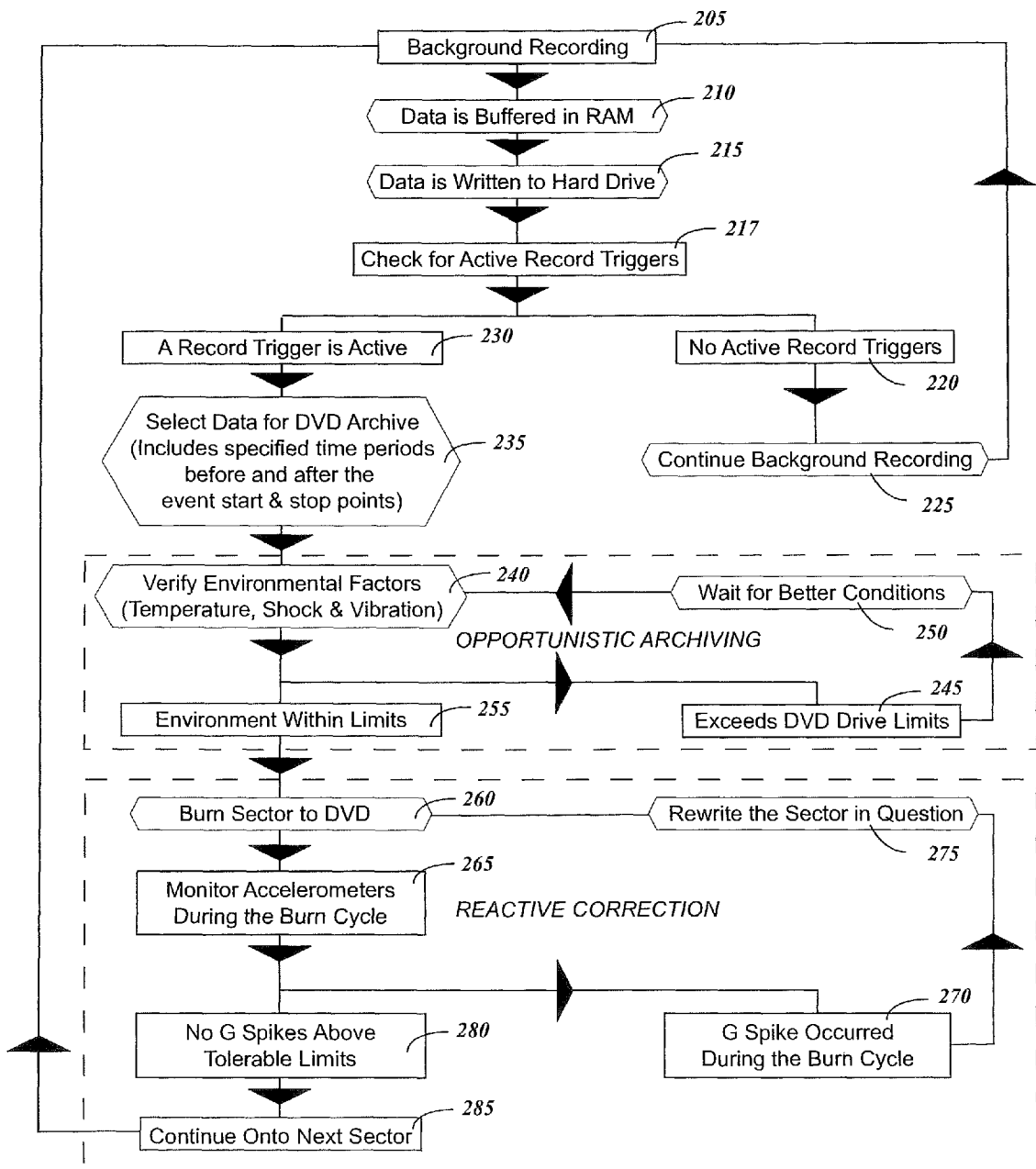
FIG. 2 is a procedure for opportunistic archiving without error checking in accordance with principles of the present invention.

Referring now to FIG. 2, a procedure for opportunistic archiving without error checking in accordance with principles of the present invention is illustrated. In step 205, background recording of data including, for example, audio data, video data, and metadata, is initiated. In background recording, an encoded stream, and optionally associated metadata, is continuously written to the hard drive 80. Thus, referring again to FIGS. 1 and 2, during background recording, the first encoded stream 60a and the second encoded stream 60b, and optionally associated metadata, are continuously written to the hard drive 80. Background recording of audio, video, and metadata is typically performed in one minute segments, although it should be understood that other segment lengths may be used. After initiation of background recording (step 205), the data is buffered in RAM (step 210) and then written to the hard drive 80 (step 215). A determination is then made regarding whether any record triggers are active (step 217). If a determination is made that no active record triggers exist (step 220), background recording is continued (step 225) and the procedure returns to step 205.

If a determination is made that a record trigger is active (step 230), the data to be archived on the DVD is selected (step 235). The range of data to be archived includes selected time periods before and after event start and stop points. For example, the system can be configured to archive a range of data that extends from ten minutes prior to the start point and ten minutes after the stop point. At step 240, a verification of environmental factors is performed to insure that environmental conditions are acceptable for recording data to the DVD disc. The environmental factors can include, for example, temperature, shock, and vibration measurements. If the environmental factors are determined to exceed DVD drive limits (step 245), better environmental conditions are waited for via use of, for example, a timer (step 250), and the procedure returns to step 240. Steps 240-255 can be characterized collectively as opportunistic-archiving steps.

If the environmental factors are determined to be within predetermined limits (step 255), burning of a sector of data to the DVD disc is initiated (step 260). During the burn cycle, accelerometers are monitored to determine whether any G-spikes exceed tolerable limits (step 265). An example of a tolerable limit for burning of data to a DVD is less than 0.3 G. If it is determined that a G-spike occurred during the burn cycle that is above tolerable limits (step 270), a decision is made to rewrite the sector in question (step 275) and the procedure returns to step 260. If it is determined that no G-spikes occurred during the burn cycle that are above the tolerable limits (step 280), the procedure continues to the next sector to be burned (step 285) and then returns to step 205. Steps 260-285 can be characterized collectively as reactive correction steps.

Figure 3:
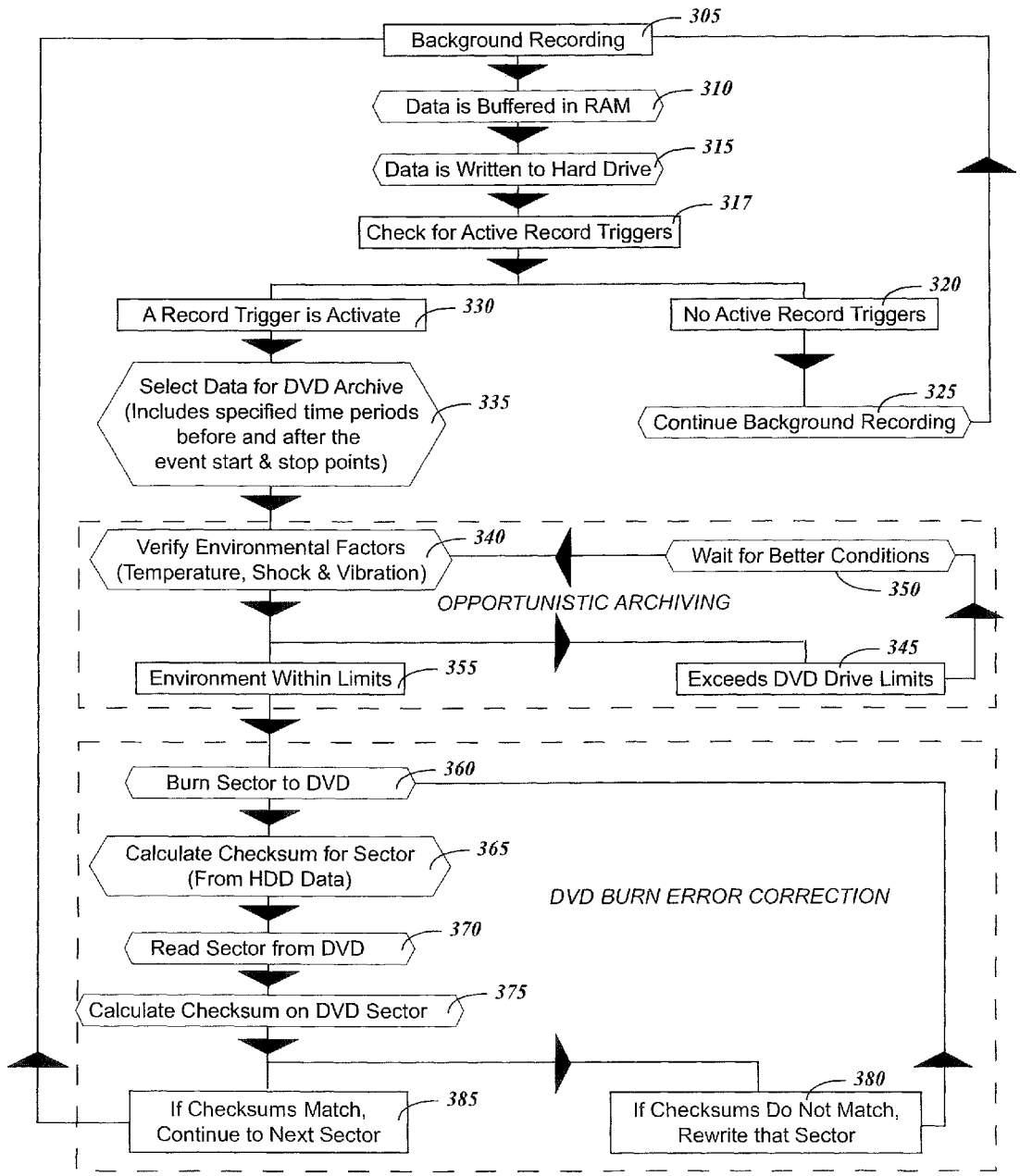
FIG. 3 is a procedure for opportunistic archiving with optional error checking in accordance with principles of the present invention.

Referring now to FIG. 3, a procedure for opportunistic archiving with optional error checking in accordance with principles of the present invention is illustrated. In step 305, background recording of data including, for example, audio data, video data, and metadata, is initiated. In background recording, an encoded stream, and optionally associated metadata, is continuously written to the hard drive 80. Thus, referring again to FIGS. 1 and 3, during background recording, the first encoded stream 60a and the second encoded stream 60b, and optionally associated metadata, are continuously written to the hard drive 80. Background recording of audio data, video data, and metadata is typically performed in one minute segments, although it should be understood that other segment lengths may be used. After initiation of background recording (step 305), the data is buffered in RAM (step 310) and then written to the hard drive 80 (step 315). A determination is then made regarding whether any record triggers are active (step 317). If a determination is made that no active record triggers exist (step 320), background recording is continued (step 325) and the procedure returns to step 305.

If a determination is made that a record trigger is active (step 330), the data to be archived on the DVD is selected (step 335). The range of data to be archived includes selected time periods before and after event start and stop points. For example, the system can be configured to archive a range of data that extends from ten minutes prior to the start point and ten minutes after the stop point. At step 340, a verification of environmental factors is performed in order to insure that environmental conditions are acceptable for recording data to the DVD disc. The environmental factors can include, for example, temperature, shock, and vibration measurements. If the environmental factors are determined to exceed DVD drive limits (step 345), better environmental conditions are waited for via use of, for example, a timer (step 350), and the procedure returns to step 340. Steps 340-355 can be characterized collectively as opportunistic archiving steps.

If the environmental factors are determined to be within predetermined limits (step 355), burning a sector of data to the DVD disc is initiated (step 360). At step 365, a checksum is calculate for the sector from hard drive data. The burned sector is then read from the DVD disc (step 370), and a checksum is calculated from the sector read from the DVD (step 375). The checksum obtained from hard drive data and the checksum obtained from the burned DVD sector are compared and, if the checksums do not match, the sector is rewritten (step 380) and the procedure returns to step 360. If the checksums match, the archiving procedure returns to step 305. Steps 360-385 can be characterized collectively as DVD burn error correction steps.

In various embodiments, an opportunistic archiving algorithm may be used that also considers, in addition to environmental factors, how much data the system needs to archive to the DVD disc. For example, if the system starts off in the morning and there have been no events and no start flags, the system is operating with zero unburned events. However, if, for example, the user gets into a high-speed chase that lasts for three hours and the system has not detected a stop trigger, the system has recorded three hours of unburned data to the hard drive 80. In this situation, the system could lower the environmental limits, at step 255 or 355 for example, in order to archive the large amount of accumulated data to the DVD disc. Environmental conditions, including a speed factor, may also be considered. The system may consider whether the vehicle is driving along at a high rate of speed (e.g., hundred miles an hour) or if it is stopped. The algorithm may also consider accumulated shock and vibration.

The algorithm processing starts with the calculation of how much data is present and comes up with a numerical value. And then the processor using the algorithm comes up with a numerical value for how conducive the environment is to DVD burning. The processor using the algorithm subtracts the environment number from the unburned data number and comes up with a value. If the value is positive, the need to burn data is greater than how bad the environmental conditions are. If the algorithm defines a negative number, the unburned data does not outweigh how bad the environmental conditions are.

If the environmental conditions are very poor, the system does not record anything. Instead, the system just waits and monitors for a while and checks the environmental conditions again. If the speed factor is zero (i.e., the car is stopped), that is preferably an automatic burn decision. Condition one is no speed, which is preferably an automatic decision to burn anything on the hard drive 80 that needs to be burned. Condition number two is unacceptable environmental conditions under which the system does not burn anything. Condition number three is somewhere in between, in which the system has some unburned event data, the car is moving, and determinations are made regarding how bad the conditions are, how much does the need to burn data outweigh the environmental conditions that the system detects.

The hard drive 80 of the system preferably has a accelerometer to detect physical shocks. When the hard drive 80 detects an unacceptable shock, the system goes back and recopies the last section. An error is assumed, so the last DVD section is overwritten. The hard drive 80 may be mounted on a vibration shock mount as well. In various embodiments, the DVD drive 85 can also include an accelerometer to detect physical shocks. Hard drives typically have a 200 g shock tolerance whereas DVD drives typically have a 0.5 g shock tolerance.

An illustrative opportunistic archiving algorithm could utilize the following equation:

(Buffer Amount) − [(Speed Factor) + (Shock Factor) + (Vibration Factor)] = Archive Threshold
where
Buffer Amount = Size of Data Buffer
Speed Factor = Accumulated Vehicle Speed From Recent History
Shock Factor = Peak Shock in Recent History
Vibration Factor = Accumulated Vibration From Recent History If the Archive Threshold is exceeded, the need to burn data overrides the environmental conditions. If the Archive Threshold is not exceeded, the amount of unburned data does not override the environmental conditions.

Automatic Chapter Segmentation by Event Markers

In various embodiments of the present invention, the system may be adapted to automatically divide the video into separate navigable chapters to make location of a specific point or event easier during playback, such that each chapter of the DVD disc contains the data from one event. This process eliminates the need to fast forward or rewind the media to search for a specific traffic stop or event. The start of an event period is determined by monitoring metadata from various devices, such as external emergency lights, emergency siren, wireless microphone activation, extreme shock data from accelerometers indicating, for example, a collision or panic braking, an elapsed time period, etc. The start of an event period can also be determined by an operator pressing a RECORD key on a control panel.

The end of an event is determined by the operator pressing a STOP key on the control panel or by the passage of a predetermined period of time after any triggering device is turned off or is inactive. In various embodiments, when the system is turned on, all video data, audio data, and metadata is continuously written to the hard drive 80, and only event data is written to the DVD disc. The system is able to automatically include video and audio data that occurred prior to the start of the event period or after the end of an event period by moving event start and end flags based on rules determined by user settings. For example, a setting in a user-interface menu can be used to determine how much data to include in the DVD chapter before and after the event markers.

Figure 4:
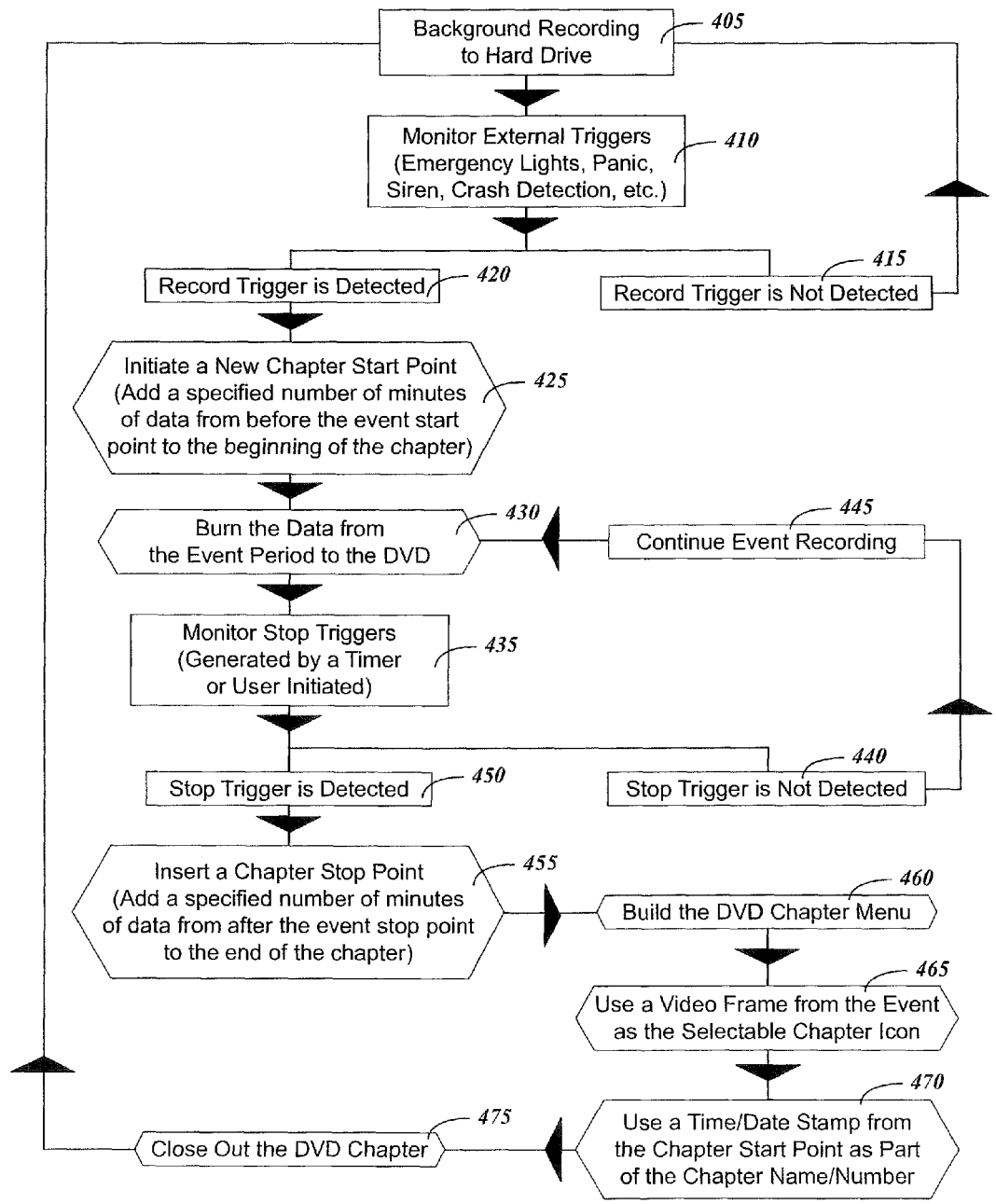
FIG. 4 is a procedure for automatic DVD-video chapter segmentation by external triggers in accordance with principles of the present invention.

Referring now to FIG. 4, a procedure for automatic DVD-video chapter segmentation by external triggers is illustrated. In step 405, background recording of data including audio, video, and metadata is initiated. In various embodiments of the present invention, background recording of audio, video, and metadata is performed in one-minute segments, although it should be understood that other segment lengths may be used. At step 410, external record triggers are monitored for the occurrence of one or more triggering events. If a record trigger is not detected (step 415), the procedure returns to step 405.

If a record trigger is detected (step 420), a new chapter start point is initiated (step 425) that includes a specified number of minutes of data from before the event start point to the beginning of the chapter. At step 430, burning of the data from the event period to the DVD is started. At step 435, monitoring of stop triggers is performed. The stop triggers may be either generated by a timer or user-initiated. If a stop trigger is not detected (step 440), event recording is continued (step 445), and the procedure returns to step 430. If a stop trigger is detected (step 450), a chapter stop point is determined, which step includes a specified number of minutes of data from after the event stop point being added to the end of the chapter (step 455). Next, the DVD chapter menu is built (step 460), a video frame from the event is selected for use as a selectable chapter icon (step 465), and a time/date stamp from the chapter stop point is used as part of the chapter name/number (step 470). Next, the DVD chapter is closed out (step 475), and the procedure returns to step 405.

Parallel High and Low Bit-Rate Encoding

In order to provide users with the ability to archive as many hours of video and audio data on to a single DVD disc, while still providing maximum video quality for important events, various embodiments of the present invention provide for encoding multiple versions of the same video and audio source in parallel. The system encodes both a high bit-rate stream and a lower bit-rate stream. Both streams are buffered and written to the hard drive 80.

The rules for archiving event data to the DVD disc can be determined by user settings. During typical operation, the system will automatically transfer the lower bit-rate video stream to the DVD disc based on event markers. Should the system capture some video or audio footage that the user deems to be important, the user can transfer the high bit-rate version to the DVD disc from data on the hard drive 80. This process allows users to make extended-length recordings without having to sacrifice audio and video quality of important events.

A user may choose high or low quality video after an event has occurred. The system by default archives events to the DVD that are low quality. After the recording has been made, if something that was important has occurred, the user can easily go back and set new start and stop flags. A section of video may be chosen, whether it was included in the original event or not, a new chapter added to the DVD, and a high resolution version of the video can be chosen to be burned to DVD. After the fact, a user can choose to grab any video from the hard drive 80 and make new chapters on the DVD. The new chapters can be based on the same event or on multiple events or non-events, and then a user could choose high or low resolution.

Figure 5:
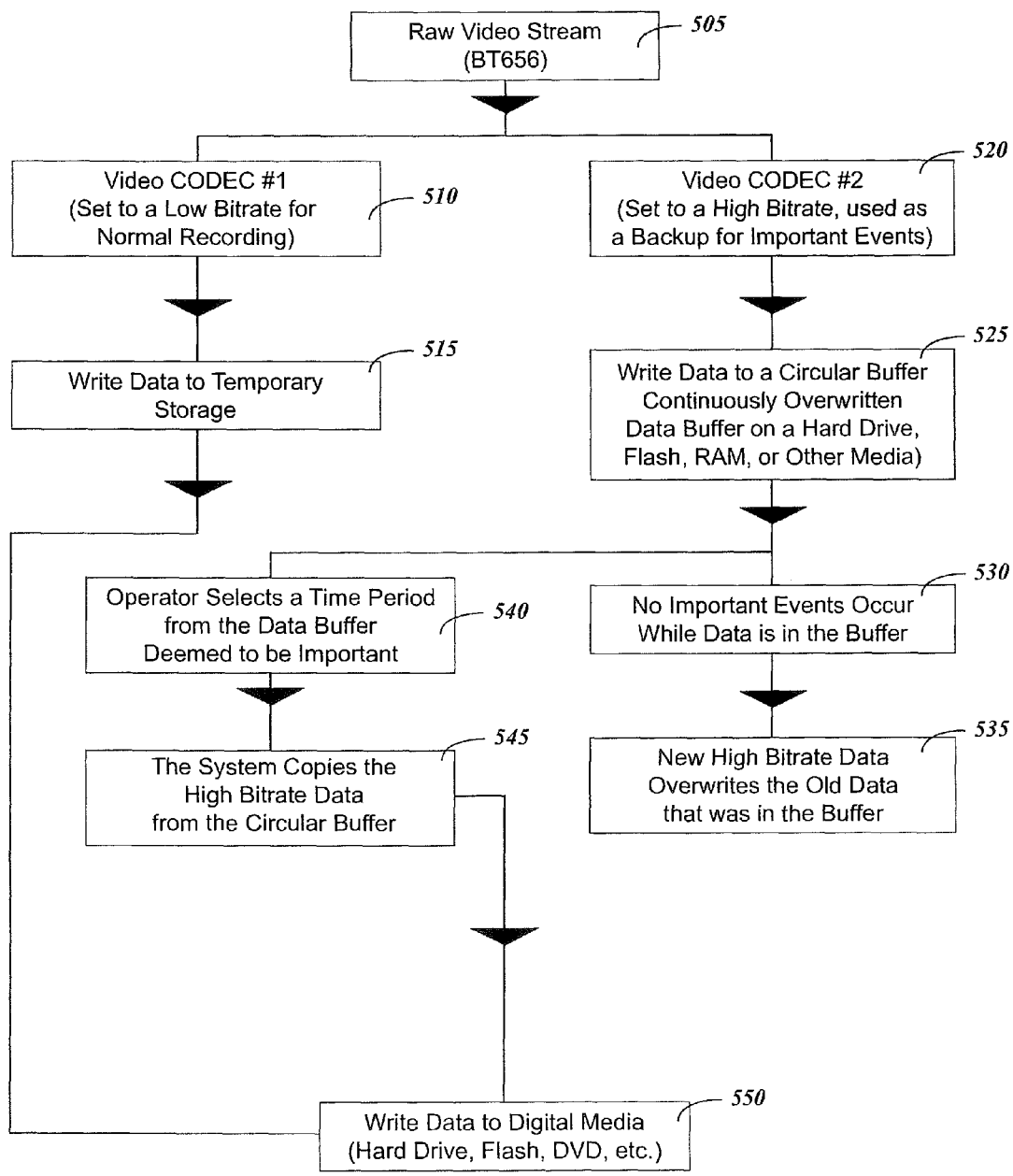
FIG. 5 is a procedure for parallel high and low bit-rate encoding with post even bit rate selection in accordance with principles of the present invention.

Referring now to FIG. 5, a procedure for high and low bit-rate encoding with post-event bit-rate selection in accordance with principles of the present invention is illustrated. In various embodiments of the present invention, the high and low bit-rate encoding occurs in parallel. At step 505, a raw video stream, such as a BT656 stream, is split into first and second streams that are identical to each other. The first stream is provided to a first video encoder 40*a*, which encodes the stream at a low bit-rate to be used for normal recording (step 510). The low bit-rate stream can be optionally written to a temporary storage area, such as a hard drive 80, Flash RAM, RAM, or other storage media (step 515). The second stream is provided to a second video encoder 40*b*, which encodes the stream at a high bit rate to be used as a backup for important events (step 520). The data of the high bit-rate stream is then written to a circular buffer (step 525), which is a continuously-overwritten data buffer on a hard drive 80, Flash RAM, RAM, or other storage media. If no important events occur while the high bit-rate data is in the circular buffer (step 530), new high bit-rate data overwrites old data in the circular buffer (step 535).

If an operator deems a time period from the data buffer to be important (step 540), the system takes the high-bit-rate data from the important time period (step 545) selected by the operator. At step 550, the low-bit-rate data and the selected portion of the high-bit-rate data are written to storage media, such as a DVD disc, hard drive, flash memory, etc. (step 550). In various embodiments, the step 550 of writing the low-bit-rate data to the storage media can include opportunistic archiving such as that described with respect to FIG. 2 and FIG. 3. In various embodiment of the present invention, step 515 of writing the low-bit-rate stream to a temporary storage can be omitted, and the low-bit-rate stream can be written directly to the storage media in step 550. In other embodiments of the present invention, the temporary storage for the low-bit-rate data and the circular buffer for the high-bit-rate data are the same hard drive, and the storage media for the low-bit-rate data and the selected portion of the high-bit-rate data are a DVD disc.

Record after-the-Fact

Recording after-the-fact permits manual chapter event creation to be performed. If a user wants to go in after the fact and copy some video that wasn't marked as an event, the user can go back and manually put in a new start and stop point. The system will automatically grab that section of video and feed it to the DVD drive 85 and make a new chapter. The common use of that feature will be by, for example, internal affairs in order to investigate some alleged misconduct. Of course, embodiments of the system may be applied to areas outside of the area of law enforcement, and then the conduct referred to may be an officer or another party in an organization utilizing the methods and systems of the present invention.

Drive Suspension System

A drive suspension system in accordance with principles of the present invention permits isolation of the DVD drive from environmental conditions that could impair DVD burning. Different suspension systems may be used in different versions of the system. One version of the system as currently envisioned is entirely overhead-console mounted. Another version of the system is a multi-piece unit (e.g., two) that may be used when there is not room to mount the overhead console-mounted version. In the second version, the user can, for example, put the recording unit underneath the seat and the display and control panel on a stalk near the radio console area. Although packaging for the drive suspension system is different on the two versions discussed, the underlying principles are analogous and other versions are possible without departing from principles of the present invention.

Figure 6:
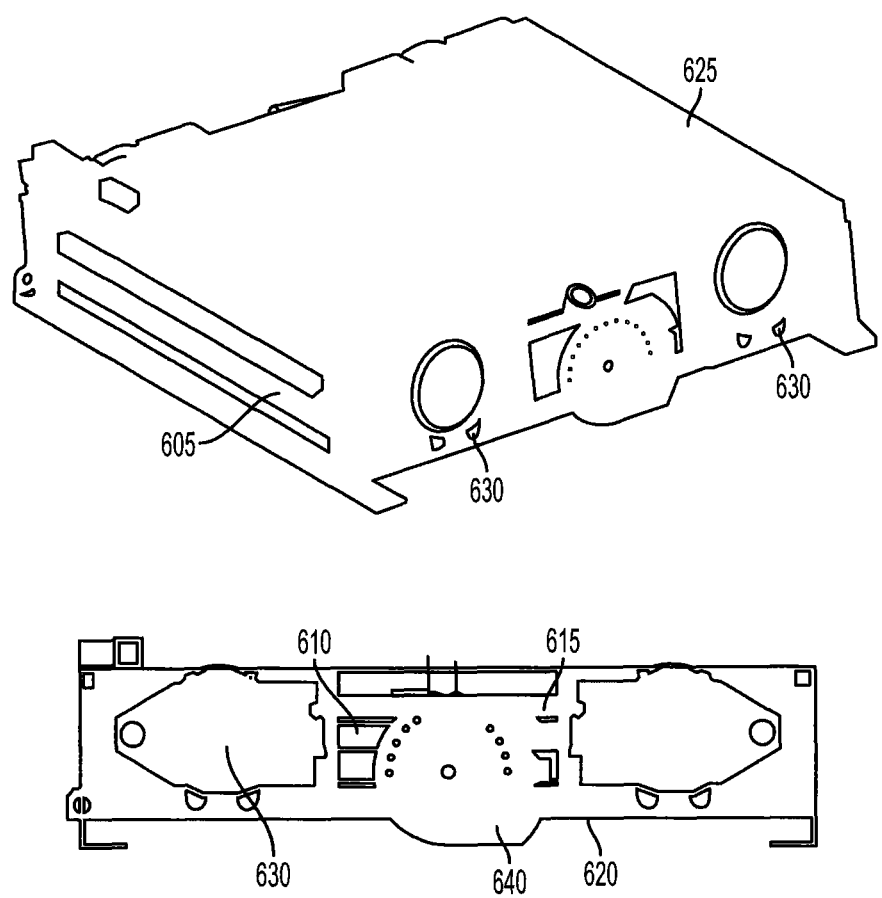
FIG. 6 is a perspective and side view of an embodiment of a drive suspension system in accordance with principles of the present invention.

Referring now to FIG. 6, a perspective and side elevational view of an embodiment of a drive suspension system in accordance with an embodiment of the present invention are illustrated. In FIG. 6, a DVD recorder drive 605 slides into a drive chassis 610. The drive suspension system includes a momentum mass in the form of a heavy steel chassis weight 615. The assembly including the DVD recorder drive 605, the drive chassis 610, and the chassis weight 615 is suspended inside an assembly shield area 620 by expansion elements, such as, for example, assembly springs 625. On the chassis 610, four pins 635 insert into four vibrational-energy-absorption elements, such as, for example, silicon-oil-filled sack dampers 630. A hole inside the particular damper shown in FIG. 6 is provided for the pins 635 from the chassis 610 to meet into. The four silicon-oil-filled sack dampers 630 serve to stabilize the floating mechanism, provide heavy damping characteristics, and reduce the resonance frequency. The chassis weight 615 provides momentum and also serves to help reduce the resonance frequency. In a typical embodiment, there is about one-half inch of suspension travel in every direction.

In the under-seat version of the system, a spring orientation pivot 640 is used to permit horizontal mounting or vertical mounting (e.g., on the side of a cage) or mounting on a stalk or on a center console. If the system is mounted flat, the springs are mounted in an upward orientation. However, if the user turns the orientation such that the drive is pointing upward and gravity is trying to pull the drive in a different direction, the spring may be pivoted so that the spring is able to handle the gravity load in that direction.

Automatic DVD-Video Disc Record Overflow Handling

Various embodiments of the invention provide a method to seamlessly allow a user to record data onto the DVD disc to the disc's capacity, yet continue to capture and prepare additional data intended to be burned onto another DVD disc. With previous in-vehicle recording systems, there was a risk of running out of media (e.g., DVD) space during the middle of a patrol officer's shift. Since the media is considered evidentiary in nature, many law enforcement agencies limit access to the media, and do not provide the officer with a second piece of media. Thus, when the media became full, it would necessitate a trip back to the police station to replace the media with blank media. Automatic DVD-Video disc record overflow handling in accordance with principles of the invention serves to eliminate the need for an officer to return to the police station to replace media during a shift. The officer may continue recording even after the DVD media is at capacity. In a typical case, the system finalizes a first DVD and automatically prepares unburned data for an additional DVD. When new media (e.g., DVD) is inserted into the drive, the unburned data is automatically transferred onto the new media.

Figure 7:
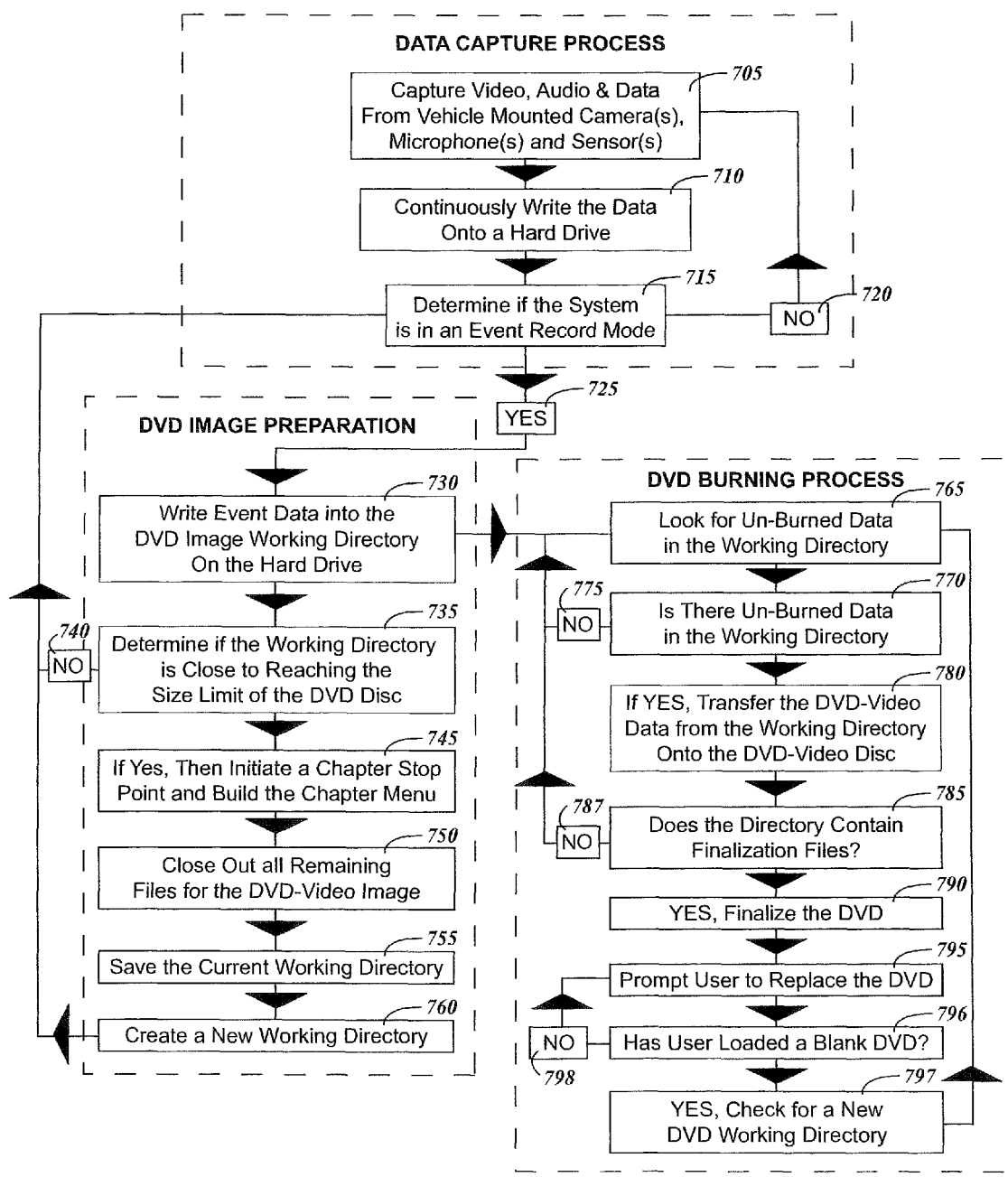
FIG. 7 is a procedure for automatic DVD-video disc record overflow handling in accordance with principles of the present invention.

Referring now to FIG. 7, a procedure for automatic DVD-video disc record overflow handling is illustrated. At step 705, video, audio, and data from vehicle mounted cameras, microphones, and sensors is captured. At step 710, video, audio, and data is continuously written onto a hard drive 80. Next, a determination is made regarding whether the system is in event-record mode (step 715). If the system is not in event-record mode, the procedure (step 720) returns to step 705. Steps 705-720 can be characterized collectively as a data-capture process.

If it is determined that the system is in event-record mode (step 725), the procedure continues to step 730, at which step data is written into a DVD image working directory on the hard drive 80. At step 735, a determination is made regarding whether the working directory is close to reaching the size limit of the DVD disc. If it is determined that the working directory is not close to reaching the size limit of the DVD disc (step 740), the procedure returns to step 715. If it is determined that the working directory is close to reaching the size limit of the DVD disc, a DVD chapter-stop point is initiated and a DVD chapter menu is built (step 745). Next, all remaining files for the DVD-video image are closed out (step 750), the current working directory is saved (step 755), and a new working directory is created (step 760). The procedure then returns to step 715. Steps 730-760 can be characterized collectively as DVD image preparation steps.

From step 730, an execution proceeds also to step 765. At step 765, un-burned data in the working directory is looked for. Next, a determination is made regarding whether there is un-burned data in the working directory (step 770). If there is no un-burned data in the working directory (step 775), the process returns to step 765. If there is unburned data in the working directory, DVD-video data from the working directory is transferred on to the DVD-video disc (step 780). At step 785, a determination is made regarding whether the working directory contains finalized files. If the working directory does not contain finalized files (step 787), the procedure returns to step 765. If the working directory contains finalized files, the DVD is finalized (step 790). At step 795, the user is prompted to replace the current DVD with a blank DVD. At step 796, a determination is made regarding if the user has loaded a blank DVD. If the user has not loaded a blank DVD (step 797), the procedure returns to step 795. If the user has loaded a blank DVD, a check is made for a new DVD working directory (step 798). The procedure then returns to step 765. Steps 765-798 can be characterized collectively as DVD burning process steps.

Automatic DVD Disc-Image Back-Up

In various embodiments, the system's hard drive 80 is formatted with a separate partition that is reserved for making mirror images of DVD discs. A typical DVD RW disc is 4.7 GB. As the system is creating a DVD disc, the system makes an exact duplicate of the entire disc on the hard drive 80 in a separate partition. An administrator or user can select how many back-up copies of DVDs the system retains.

As the user continues to create new DVDs, the oldest hard-drive backup will be overwritten; thus, if the user selected three back-up images, by the time the user creates the fourth DVD, the oldest one is being overwritten with a mirror image of the number four disc. Using this feature, if an original DVD is lost, unreadable, or intentionally destroyed, a supervisor can go back and create an exact copy of the same DVD disc.

Video Data Security

Since the system's video files are typically in MPEG-2 format, the files could conceivably be manipulated using video-editing tools. In litigation, attorneys could attempt bring into question the authenticity of the MPEG files, suggesting that they could be exported, manipulated, and then re-inserted onto the disc. The system thus uses checksums in some embodiments to ensure that the files have not been manipulated or edited.

First Level of Security—The Self-Verifying Checksum Result

When the system is ready to close a DVD disc (e.g., just prior to disc ejection), the system performs a checksum calculation on the disc contents and writes that result into a hidden and/or encrypted file saved on the DVD disc. By using a video utility, the DVD disc can be analyzed to see if a checksum result from the disc's contents matches the result of the hidden (and/or encrypted) checksum result on that DVD disc. This process verifies that the disc content matches the checksum file.

Second Level of Security—System Verification of the Hidden (or Encrypted) Checksum Files The system also provides a method to verify that the checksum file that is hidden on a DVD disc has not been recreated to match a manipulated disc. This is done by comparing subsequently-recorded DVD discs (e.g., discs recorded using the same system) to the DVD disc in question. The system automatically generates a unique disc serial number for each DVD disc it records. This serial number is written onto the DVD disc and is also saved into a log file in the system's non-volatile memory. When a DVD disc is closed, the checksum result of that DVD disc is also written to the log file in the system's non-volatile memory.

The log file preferably contains the serial number and checksum result of every DVD disc that that specific system has authored. The entire contents of the log files that are stored on the system's non-volatile memory may then be copied onto every DVD disc the system creates. Every DVD disc created by a specific system can be used to verify the validity of a checksum result contained on any other DVD disc previously recorded by the same system.

Covert Recording Mode

In various embodiments of the present invention, the system has the ability to be placed into a covert-recording mode. In this mode, the system has the appearance of being powered off. However, it is actually recording data, such as video and audio, on the hard drive 80. The covert-recording mode permits events inside a patrol car to be recorded without a suspect being aware that he is being recorded. A record trigger is generated when the system is placed into covert-recording mode. However, the system will only archive to the DVD after the system has been taken out of covert recording mode to prevent the DVD drive noise from giving an indication that the system is not actually powered off.

In an illustrative example of placing the system into covert recording mode, a user presses and holds a power OFF key for more than 2 seconds. A sound indicates that the unit has been placed into covert recording mode and all lights, backlights, indicators, and displays are turned off. This gives the appearance to a back-seat occupant that the unit is turned off. The system automatically selects an interior camera input to be recorded. The covert mode is ended by pressing POWER ON or a STOP key. At that time, the system lights, backlights, indicators, and displays are turned on, and the video that has been marked for recording will be archived to the DVD disc.

Various embodiments of the invention may reside in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Various embodiments of the invention may also be embodied in a computer program product, as will now be explained. On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software may be associated with a computer usable medium.

For the sake of simplicity, therefore, the term "program product" is thus used to refer to a computer useable medium, as defined above, which bears in any form of software to enable a computer system to operate according to the above-identified invention. Thus, the invention may also be embodied in a program product bearing software that enables a computer to perform management of information according to the invention.

In the foregoing Detailed Description, it can be seen that various features may be grouped together into a single embodiment for the purpose of streamlining the disclosure. This method of disclosure is not to be interpreted as reflecting an intention that the claimed embodiment(s) of the invention require more features than are expressly recited in each claim. Rather, as the following claims reflect, inventive subject matter lies in less than all the features of a single disclosed embodiment. Thus, the following claims are hereby incorporated into the Detailed Description, with each claim standing on its own as a separate embodiment of the invention.

What is claimed is:

1. A data-overflow-handling method comprising:
storing at least one of captured audio data, video data, and metadata to a first directory of a non-removable data storage medium;
determining whether an event is being recorded;
responsive to a determination that an event is being recorded, storing an image of the stored at least one of captured audio data, video data, and metadata to a second directory of the non-removable data storage medium;
determining whether a predefined capacity threshold relative to a removable data storage medium has been exceeded;
responsive to a determination that the predefined capacity threshold has been exceeded, creating a third directory of the non-removable data storage medium;
determining whether data in the second directory of the non-removable storage medium has not been stored to the removable data storage medium;
responsive to a determination that data in the second directory of the non-removable storage medium has not been stored to the removable data storage medium, storing any unstored data in the second directory to the removable data storage medium;
determining whether the second directory contains finalization files;
responsive to a determination that the second directory contains finalization files, finalizing the removable storage medium and providing a prompt to insert another removable storage medium; and
responsive to a determination that the second directory contains no finalization files, returning to the step of determining whether data in the second directory of the non-removable storage medium has not been stored to the removable data storage medium.

2. The data-overflow-handling method of claim 1, further comprising, responsive to insertion of another removable data storage medium, checking for the third directory.

3. The data-overflow-handling method of claim 2, further comprising:
determining whether data in the third directory of the non-removable storage medium has not been stored to the removable data storage medium;
responsive to a determination that data in the third directory of the non-removable storage medium has not been stored to the removable data storage medium, storing any unstored data in the third directory to the new removable data storage medium;
determining whether the third directory contains finalization files;
and responsive to a determination that the third directory contains finalization files, finalizing the removable storage medium and providing a prompt to insert another removable storage medium.

4. The data-overflow-handling method of claim 1, wherein:
a hard drive comprises the non-removable data storage medium; and
the removable data storage medium is a digital video disc.

5. A data-overflow-handling computer system comprising:
a processor; and
a memory including software instructions adapted to enable the computer system to perform the steps of:
storing at least one of captured audio data, video data, and metadata to a first directory of a non-removable data storage medium;
determining whether an event is being recorded;
responsive to a determination that an event is being recorded, storing an image of the stored at least one of captured audio data, video data, and metadata to a second directory of the non-removable data storage medium;
determining whether a predefined capacity threshold relative to a removable data storage medium has been exceeded;
responsive to a determination that the predefined capacity threshold has been exceeded, creating a third directory of the non-removable data storage medium;
determining whether data in the second directory of the non-removable storage medium has not been stored to the removable data storage medium;
responsive to a determination that data in the second directory of the non-removable storage medium has not been stored to the removable data storage medium, storing any unstored data in the second directory to the removable data storage medium;
determining whether the second directory contains finalization files;
responsive to a determination that the second directory contains finalization files, finalizing the removable storage medium and providing a prompt to insert another removable storage medium; and
responsive to a determination that the second directory contains no finalization files, returning to the step of determining whether data in the second directory of the non-removable storage medium has not been stored to the removable data storage medium.

6. The computer system of claim 5, further comprising software instructions adapted to enable the computer system to perform the step of, responsive to insertion of another removable data storage medium, checking for the third directory.

7. The system of claim 6, further comprising software instructions adapted to enable the computer system to perform the steps of:
determining whether data in the third directory of the non-removable storage medium has not been stored to the removable data storage medium;
responsive to a determination that data in the third directory of the non-removable storage medium has not been stored to the removable data storage medium, storing any unstored data in the third directory to the new removable data storage medium;
determining whether the third directory contains finalization files; and
responsive to a determination that the third directory contains finalization files, finalizing the removable storage medium and providing a prompt to insert another removable storage medium.

8. The system of claim 5, wherein:
a hard drive comprises the non-removable data storage medium; and the removable data storage medium is a digital video disc.

* * * * *